(12) United States Patent
Kitano et al.

(10) Patent No.: US 11,852,316 B2
(45) Date of Patent: Dec. 26, 2023

(54) CONSTRUCTION COMPONENT, LIGHT RADIATING SYSTEM, AND ILLUMINATION SYSTEM

(71) Applicant: Panasonic Intellectual Property Management Co., Ltd., Osaka (JP)

(72) Inventors: Hiroshi Kitano, Hyogo (JP); Kenichiro Tanaka, Osaka (JP); Takanori Aketa, Osaka (JP); Yoshiyuki Takegawa, Nara (JP); Satoshi Hyodo, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/915,868

(22) PCT Filed: Mar. 16, 2021

(86) PCT No.: PCT/JP2021/010683
§ 371 (c)(1),
(2) Date: Sep. 29, 2022

(87) PCT Pub. No.: WO2021/200128
PCT Pub. Date: Oct. 7, 2021

(65) Prior Publication Data
US 2023/0151936 A1    May 18, 2023

(30) Foreign Application Priority Data
Mar. 31, 2020    (JP) .................. 2020-064786

(51) Int. Cl.
*F21S 8/02*   (2006.01)
*F21S 2/00*   (2016.01)
*F21V 7/05*   (2006.01)

(52) U.S. Cl.
CPC ............. *F21S 8/026* (2013.01); *F21S 2/00* (2013.01); *F21V 7/05* (2013.01)

(58) Field of Classification Search
CPC ............. F21S 8/026; F21S 2/00; F21V 7/05
See application file for complete search history.

(56) References Cited

U.S. PATENT DOCUMENTS

2011/0122627 A1    5/2011    Hikmet et al.
2011/0279039 A1    11/2011   Kishimoto et al.
(Continued)

FOREIGN PATENT DOCUMENTS

DE    102012206644 A1    10/2013
JP    2000-100202 A    4/2000
(Continued)

OTHER PUBLICATIONS

International Search Report dated May 18, 2021 issued in International Patent Application No. PCT/JP2021/010683, with English translation.
(Continued)

*Primary Examiner* — Matthew Mikels
*Assistant Examiner* — Jose M Diaz
(74) *Attorney, Agent, or Firm* — Rimon P.C.

(57) ABSTRACT

A construction component forms at least a part of a structure that faces a target space. The construction component has a first function, a second function, and a third function. The first function is a function of emitting illumination light toward the target space. The second function is a function of allowing incident light to enter the construction component. The incident light is emitted from a light source disposed out of a projection area, viewed from the target space, of the construction component and is incident on the construction component via a light transmission member. The third function is a function of converting the incident light into the illumination light.

17 Claims, 9 Drawing Sheets

(56) References Cited

U.S. PATENT DOCUMENTS

| | | | |
|---|---|---|---|
| 2013/0247352 A1 | 9/2013 | Noguchi et al. | |
| 2014/0016300 A1* | 1/2014 | Sato .................. | F21S 41/16 362/84 |
| 2018/0017220 A1 | 1/2018 | Kitano | |

FOREIGN PATENT DOCUMENTS

| | | | |
|---|---|---|---|
| JP | 2000-353407 | A | 12/2000 |
| JP | 2001-093303 | A | 4/2001 |
| JP | 2010-205482 | A | 9/2010 |
| JP | 2011-243376 | A | 12/2011 |
| JP | 2012-182003 | A | 9/2012 |
| JP | 2013-114982 | A | 6/2013 |
| JP | 2013-201088 | A | 10/2013 |
| JP | 2016-096048 | A | 5/2016 |

OTHER PUBLICATIONS

Extended European Search Report dated Jul. 27, 2023 issued for the corresponding European Patent Application No. 21779041.9.
Notice of Reasons for Refusal received in Japanese Application No. 2022-511824, dated Oct. 16, 2023.

* cited by examiner

CONSTRUCTION COMPONENT, LIGHT RADIATING SYSTEM, AND ILLUMINATION SYSTEM

CROSS-REFERENCE OF RELATED APPLICATIONS

This application is the U.S. National Phase under 35 U.S.C. § 371 of International Patent Application No. PCT/JP2021/010683, filed on Mar. 16, 2021, which in turn claims the benefit of Japanese Patent Application No. 2020-064786, filed on Mar. 31, 2020, the entire disclosures of which Applications are incorporated by reference herein.

TECHNICAL FIELD

The present disclosure generally relates to a construction component, a light radiating system, and an illumination system, and more particularly to a construction component that emits illumination light, a light radiating system including the construction component, and an illumination system including the light radiating system.

BACKGROUND ART

Described in Patent Literature 1 is a construction panel with a lighting function. the construction panel with a lighting function described in Patent Literature 1 includes an outer frame, a metal frame, a front panel plate, a light source, and a light-guiding plate. The outer frame consists of a construction component. The metal frame is attached to the outer frame. The front panel plate is detachably attached to the metal frame. The light-guiding plate is arranged between the metal frame and the front panel plate. The light source is disposed so as to make its light-emitting portion face the light-guiding plate. The light-guiding plate guides the incident light coming from the light source therethrough, and emits the light from its emitting face facing the front panel plate.

In addition, Patent Literature 1 discloses that a construction panel with a lighting function is installed between two construction panels without a lighting function when constructing the construction panel into a ceiling.

It has been difficult to realize weigh reduction of the construction panel with a lighting function described in Patent Literature 1.

CITATION LIST

Patent Literature

Patent Literature 1: JP2013-114982 A

SUMMARY OF INVENTION

It is therefore an object of the present disclosure to provide a construction component, a light radiating system, and an illumination system, all of which are configured or designed to reduce the weight of the construction component that can emit an illumination light.

A construction component according to one aspect of the present disclosure forms at least a part of a structure facing a target space. The construction component has a first function, a second function, and a third function. The first function is a function of emitting illumination light toward the target space. The second function is a function of allowing the incident light to enter the construction component. The incident light is emitted from a light source disposed out of a projection area, viewed from the target space, of the construction component, and is incident on the construction component via a light transmission member. The third function is a function of converting the incident light into the illumination light.

A light radiating system according to another aspect of the present disclosure includes the construction component and the light transmission member.

An illumination system according to still another aspect of the present disclosure includes the light radiating system and the light source.

DESCRIPTION OF EMBODIMENTS

Note that figures to be referred to in the following description of the first through sixth embodiments are just schematic representations, in which the dimensions and thicknesses of respective constituent elements and their ratios are not always to scale, compared with their actual dimensional ratios.

First Embodiment

Figure 2A:
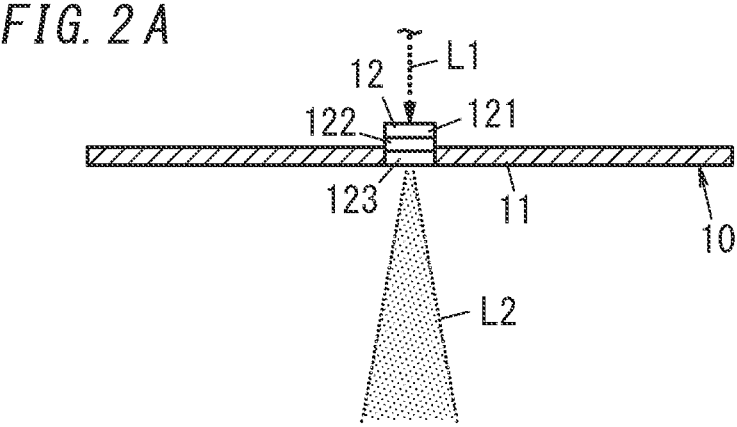
FIG. 2A is a cross-sectional view, taken along a plane X2-X2 shown in FIG. 2B, of the construction component.
Figure 2B:
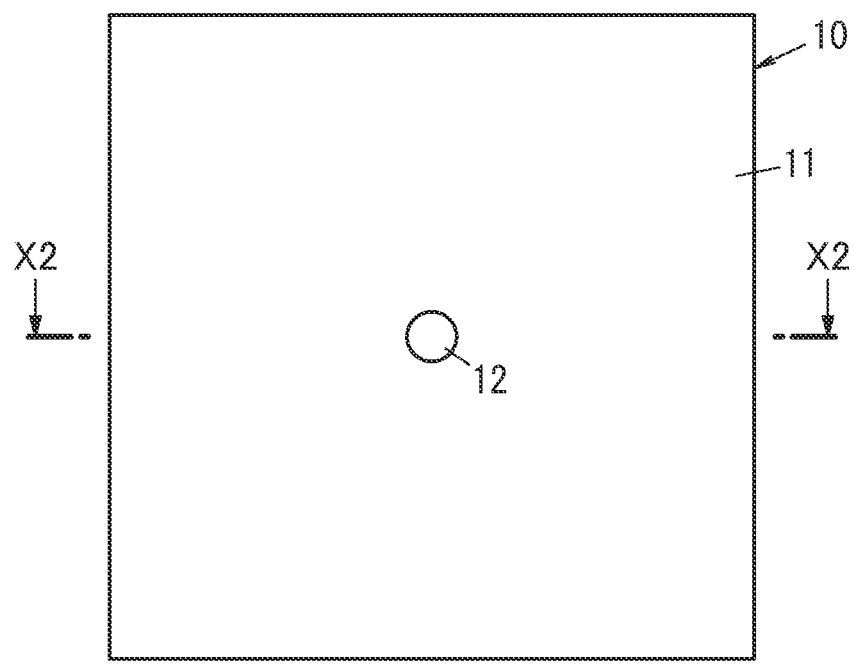
FIG. 2B is a bottom view illustrating the construction component.
Figure 3:
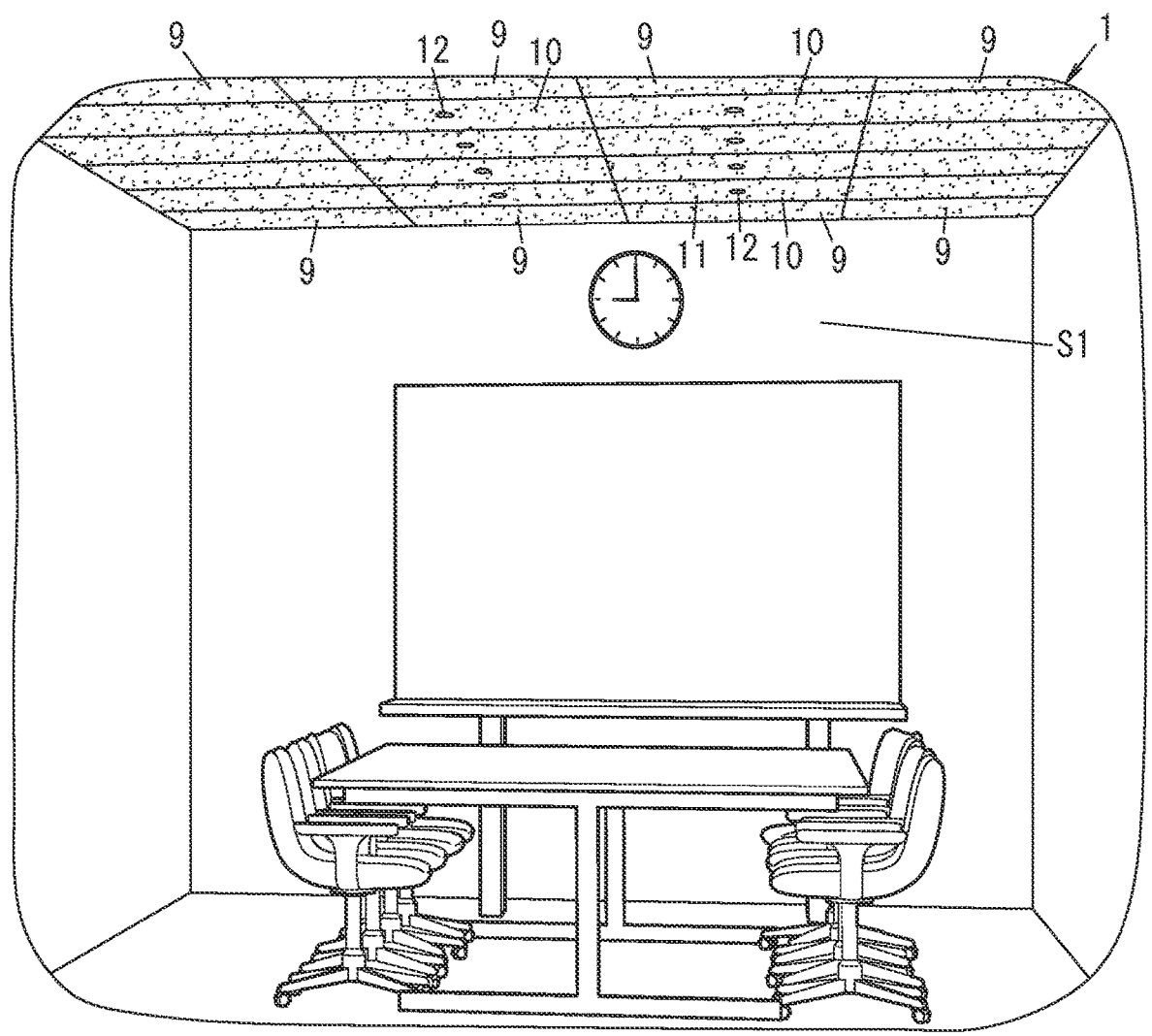
FIG. 3 is a perspective view illustrating a structure including the construction component.

Below, a construction component 10, a light radiating system 100, and an illumination system 200 according to the first embodiment will be described with reference to FIGS. 1-3.

(1) Overview

The construction component 10 serves as at least a part of a structure 1 that faces a target space S1. "Faces the target space S1" means the structure 1 is in contact with the target space S1. The structure 1, including the construction component 10 according to the first embodiment, is in contact with the target space S1 to define the target space S1. The structure 1 may be a ceiling in a facility (e.g., an office construction) (refer to FIG. 3). The target space S1 is a space under the ceiling. The ceiling may be a complex ceiling system and include a grid-like support member, a plurality of ceiling members (ceiling panels) 9 to be supported by the support member, and the construction component 10. Each of the plurality of ceiling members 9 has a panel shape. The ceiling member 9 has a shape of square when viewed along the thickness direction of the ceiling member 9, but it may be rectangular. The construction component 10 has a panel shape. The construction component 10 is a ceiling member. The construction component 10 is supported by the support member, as with the ceiling members 9. The construction component 10 is arranged adjacent to at least one of the plurality of ceiling members 9.

The construction component 10 converts incident light L1 (refer to FIG. 2A) into illumination light L2 and emits the illumination light L2 into the target space S1. The incident light L1 is emitted from a light source 2, and is incident on the construction component 10 via a light transmission member 3. The light source 2 is disposed out of a projection area A10, viewed from the target space S1, of the construction component 10. "A projection area A10, viewed from the target space S1, of the construction component 10" means the projection area of the construction component 10 viewed along a direction perpendicular to a main surface 111, which is in contact with the target space S1, of the construction component 10.

The light radiating system 100 includes the construction component 10 and the light transmission member 3. The illumination system 200 includes the light radiating system 100 and the light source 2. The light radiating system 100 makes light that has been emitted from the light source 2 incident on the construction component 10 as the incident light L1 via the light transmission member 3, and converts, in the construction component 10, the incident light L1 into the illumination light L2, and emits the illumination light L2 from the construction component 10.

The illumination system 200 makes the light source 2 emit light, makes the light incident on the construction component 10 as the incident light L1 via the light transmission member 3, and converts, in the construction component 10, the incident light L1 into the illumination light L2, and emits the illumination light L2 from the construction component 10.

The facility is not limited to office constructions, and it may be stand-alone houses, apartments, stores, museums, hotels, factories, stadiums, airports, or other constructions.

(2) Configuration of Illumination System

Figure 1:
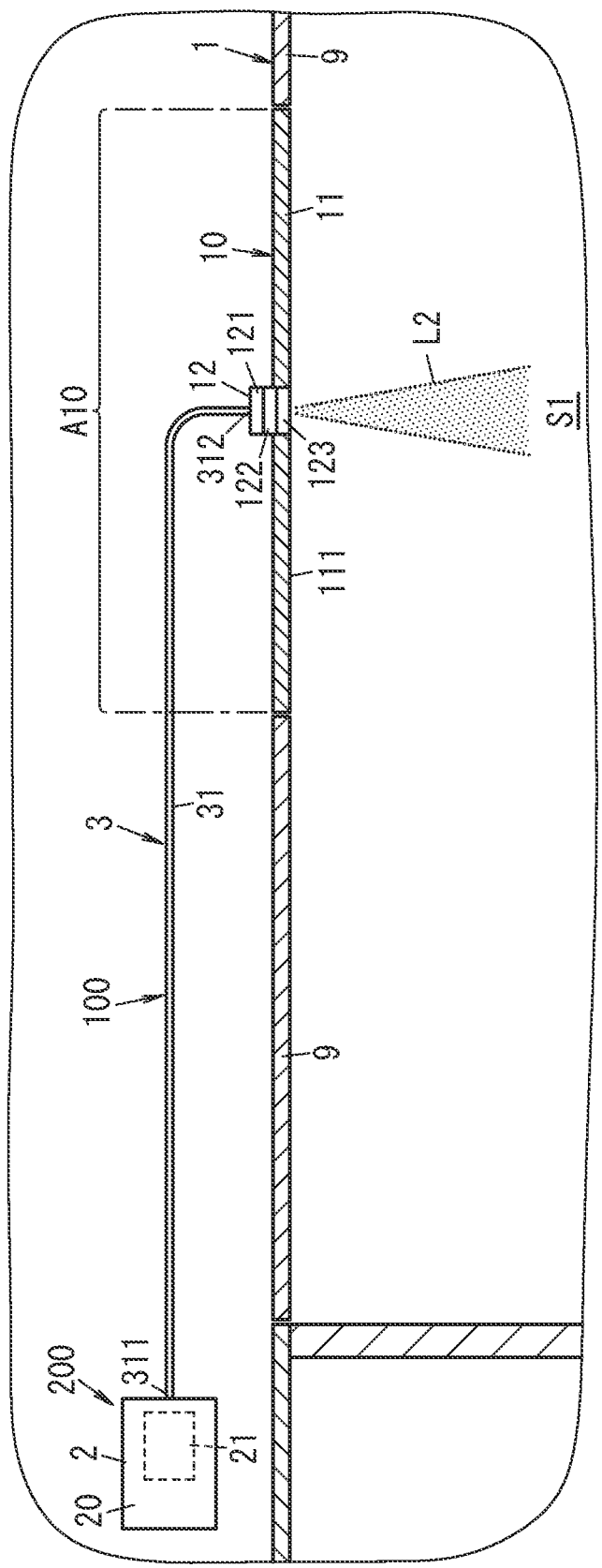
FIG. 1 illustrates a configuration of an illumination system including a construction component according to a first embodiment.

The illumination system 200 includes, as shown in FIG. 1, the light source 2, the light transmission member 3, and the construction component 10.

(2.1) Light Source

The light source 2 includes a laser light source 21. The light emitted from the light source 2 may be light emitted from the laser light source 21. The laser light source 21 may be a semiconductor laser that emits a blue light ray (a laser beam), for example, thus allowing the light source 2 to emit a blue light ray. The semiconductor laser may be a GaN-based semiconductor laser, for example. The peak wavelength of the laser light falls within the range from 440 nm to 480 nm, for example.

The light source 2 includes a case 20, which contains the laser light source 21. The case 20 is disposed at a position away from the construction component 10. More specifically, the light source 2 is disposed out of the projection area A10, viewed from the target space S1, of the construction component 10. For example, the light source 2 is disposed in the ceiling space. However, this is only an example and should not be construed as limiting. The light source 2 may be disposed on the surface of the floor behind a wall that defines the target space S1 together with the structure 1. In the construction component 10 according to the first embodiment, the projection area A10, viewed from the target space S1, of the construction component 10 is the projection area (a vertical projection area), viewed from the target space S1 in a thickness direction of the construction component 10 having a panel shape, of the construction component 10. In conclusion, the projection area A10 is a projection area along a thickness direction of the construction component 10.

(2.2) Light Transmission Member

The light transmission member 3 includes an optical fiber 31. The optical fiber 31 includes a core, a clad, and a coating portion. The clad covers the outer peripheral surface of the core. The coating portion covers the outer peripheral surface of the clad. The core has a first end face, and a second face opposite from the first end face. A cross section, taken along a plane perpendicular to the optical axis, of the core has a circular shape. The clad is disposed coaxially with the core. The material of the core includes a light-transmitting material. The light transmitting-material may be, for example, a fluoride, an oxide, or a nitride. The fluoride may be glass fluoride. The oxide may be a silicon oxide or quartz, for example. The refractive index of the clad is less than the refractive index of the core. The coating portion covers the outer peripheral surface of the clad. The material of the coating portion may be a resin, for example.

The core of the optical fiber 31 may have a diameter falling within the range from 20 μm to 1000 μm, for example. The optical fiber 31 may have a length falling within the range from 1 m to 100 m, for example. If the diameter of the core of the optical fiber 31 is less than 20 μm, it becomes difficult to optically couple the light of the laser light source 21 with the optical fiber 31 with high efficiency. If the diameter of the core of the optical fiber 31 is more than 1000 μm, it becomes difficult to bend the optical fiber 31 with a small bending radius, thus increasing handling restrictions.

The optical fiber 31 includes a first end 311 and a second end 312, which are arranged opposite from each other in its lengthwise direction. The first end 311 of the optical fiber 31 includes an incident end face (the first end face of the core) on which light emitted from the light source 2 is incident. The second end 312 of the optical fiber 31 includes an emerging end face (the second end face of the core) from which the light is emitted that has been incident on the incident end face and been transmitted through the optical fiber 31. The first end 311 of the optical fiber 31 may be connected to the laser light source 21 via an optical fiber connector, for example. This connection allows the core of the optical fiber 31 to be coupled with the laser light source 21 optically. The second end 312 of the optical fiber 31 is connected with a light input/output portion 12 of the construction component 10 via an optical fiber connector, for example. This connection allows the core of the optical fiber 31 to be optically coupled with the light input/output portion 12 of the construction component 10.

When a person in the target space S1 sees the structure 1, he or she cannot see the optical fiber 31 because the optical fiber 31 is covered by the structure 1 containing the construction component 10. In other words, a part of the optical fiber 31 is shielded by the construction component 10.

(2.3) Construction Component

The construction component 10 according to the first embodiment is a ceiling member that is arranged adjacent to at least one of the plurality of ceiling members 9 (which do not include the construction component 10 by definition). However, this is only an example and should not be construed as limiting. The construction component 10 may be arranged adjacent to another construction component 10. The construction component 10 has a panel shape and square, like the ceiling member 9, when viewed in its thickness direction. However, this is only an example and should not be construed as limiting. The construction component 10 may be rectangular. In this specification, "the construction component 10 is viewed in the thickness direction of construction component 10" means that the construction component 10 is viewed from the target space S1 in the thickness direction of the construction component 10, for example. It does not mean that the construction component 10 is viewed from an opposite side to the target space S1 with reference to the construction component 10 in the thickness direction of the construction component 10. The size of the construction component 10 is the same as the size of the ceiling member 9, but they may be different in size from each other. The construction component 10 is, like the ceiling members 9, supported by the support member. The support member may be, for example, formed of a plurality of galvanized steel plates or other similar members.

The construction component 10 includes a main body 11 and the light input/output portion 12. The light input/output portion 12 is integrally formed with the main body 11. Therefore, a position, relative to the target space S1, of the light input/output portion 12 is determined when the construction component 10 is supported by the support member.

The main body 11 has a panel shape. Viewed in the thickness direction of the construction component 10, an outer peripheral shape of the main body 11 is the same as an outer peripheral shape of the construction component 10. In other words, viewed from the thickness direction of the construction component 10, the outer peripheral shape of the construction component 10 is the same as the outer peripheral shape of the main body 11. In addition, viewed in the thickness direction of the construction component 10, size of the construction component 10 is the same as size of the main body 11.

The main body 11 may be, for example, made of decorative plywood or decorative boards. Examples of the decorative plywood include natural-wood decorative board and specially-treated decorative board. Examples of the specially-treated decorative board include synthetic resin decorative board, printed plywood, vinyl chloride decorative plywood, and overlayed plywood made of paper or cloth. Examples of the decorative board include MDF (medium-quality fiber board), volcanic silicates fiber reinforced multilayer board, rock wool board, calcium silicate plate, and insulation board. The main body 11 include, for example, light-proofness, incombustibility, sound absorbency, and heat-insulating properties. Here, the main body 11 may include at least light-proofness and incombustibility.

The light input/output portion 12 is, viewed in the thickness direction of construction component 10, located within a circumferential periphery (an outer edge) of the main body 11 and is apart from the circumferential periphery of the main body 11. In the construction component 10 according to the first embodiment, the light input/output portion 12 penetrates through a substantial center part of the main body 11. Viewed in the thickness direction of the construction component 10, the outer peripheral shape of the light input/output portion 12 is circular. In order for the light input/output portion 12 to be hardly seen by a person in the target space S1, the area of the light input/output portion 12 is, viewed in the thickness direction of the construction component 10, suitably much more smaller than the area of the main body 11. The diameter of the light input/output portion 12 is equal to or less than one tenth of one side of the main body 11, viewed in the thickness direction of the construction component 10, suitably equal to or less than one twentieth, and more suitably equal to or less than one thirtieth.

The light input/output portion 12 has translucency so that part of the incident light L1 (refer to FIG. 2A) can pass therethrough. The incident light L1 is emitted from the light source 2, which is disposed out of the projection area A10, viewed from the target space S1, of the construction component 10, and is incident on the construction component 10 via the light transmission member 3. In addition, the light input/output portion 12 emits the illumination light L2, which includes part of the incident light L1, toward the target space S1. The illumination light L2 may be white light.

The construction component 10 has a first function, a second function, and a third function. The first function is a function of emitting the illumination light L2 toward the target space S1. The second function is a function of allowing the incident light L1 to enter the construction component 10. The incident light L1 is emitted from the light source 2, which is disposed out of the projection area A10, viewed from the target space S1, of the construction component 10, and is incident on the construction component 10 via the light transmission member 3. The third function is a function of converting the incident light L1 into the illumination light L2. The incident light L1 is light with a high coherence (coherent light) and the illumination light L2 is light with a low coherence (incoherent light). In the construction component 10, the light input/output portion 12 has the first function, the second function, and the third function.

The feature that the light input/output portion 12 "has translucency" means that the ratio of the optical energy of the illumination light L2 to the optical energy of the incident light L1 incident on the light input/output portion 12 is equal to or more than 10%. The ratio may be suitably equal to or more than 20%, and more suitably equal to or more than 40%.

The light input/output portion 12 includes a light-input portion 121, a wavelength-converting portion 122, and a light-outputting portion 123. In the light input/output portion 12, the light-outputting portion 123, the light-input portion 121, and the wavelength-converting portion 122 has the first function, the second function, and the third function, respectively. The third function includes a function of converting the incident light L1 into the illumination light L2 containing light having a wavelength different from that of the incident light L1.

The light-input portion 121 allows the incident light L1 to enter the construction component 10. The incident light L1 is incident on to the construction component 10 via the light transmission member 3, and transmits the incident light L1 to the wavelength-converting portion 122. In other words, the light-input portion 121 suitably has low reflectivity and absorptivity to the incident light L1. The light-input portion 121 may include, for example, an optical connector to which the optical fiber connector is detachably connected, the optical fiber connector being connected to the second end 312 of optical fiber 31.

The wavelength-converting portion 122 includes a light transmission material portion and fluorescent particles, for example. In this case, the wavelength-converting portion 122 includes a mixture of the light transmission material portion and the fluorescent particles. The wavelength-converting portion 122 includes the light transmission material portion containing a lot of fluorescent particles. The material (light transmission material) of the light transmission material portion is suitably a material having a high transmittance for a visible light ray. The light transmission material may be a silicone-based resin, for example. This allows the light input/output portion 12 to have improved heat proofness and weatherability of the wavelength-converting portion 122. "Silicone-based resin" may be, for example, a silicone resin or a denatured silicone resin. The wavelength-converting portion 122 includes, as a wavelength-converting element, fluorescent particles. The wavelength-converting element converts a part of the incident light L1 that has been supplied by the light-input portion 121 and emits the light having wavelength different from that of the incident light L1. As the fluorescent particles, for example, yellow fluorescent particles radiating yellow light may be employed. The light (fluorescence) emitted from the yellow fluorescent particles may, for example, suitably have an emission spectrum with a main light-emitting peak wavelength falling within the wavelength range from 530 nm to 580 nm. The yellow fluorescent particles may be $Y_3Al_5O_{12}$ activated with Ce, for example. However, this is only an example and should not be construed as limiting.

The wavelength-converting portion 122 includes, as the wavelength-converting element, only yellow fluorescent particles. However, this is only an example and should not be construed as limiting. The wavelength-converting portion 122 contains, for example, yellow fluorescent particles, yellow-green fluorescent particles, green fluorescent particles, and red fluorescent particles. In other words, the wavelength-converting portion 122 may include plural kinds of fluorescent particles.

The light-outputting portion 123 is made from a light transmission material that does not contain fluorescent particles. The light transmission material may be a silicone resin, for example.

However, this is only an example and should not be construed as limiting. The light transmission material may contain, for example, a fluorine-based resin, low-melting point glass, or sol-gel glass. The light transmission material may suitably include a material having a high transmittance for visible light. The light-outputting portion 123 may include light scattering particles. In addition, the light-outputting portion 123 may have a lens shape that can control light distribution of the illumination light L2 to be emitted from the light-outputting portion 123. Since the light-outputting portion 123 is in contact with the target space S1, the light-outputting portion 123 may include a reflection-reducing portion to reduce Fresnel reflection. The reflection-reducing portion may be made from a material having a refractivity smaller than that of the light transmission material portion of the wavelength-converting portion 122, or may be microscopic surface unevenness having a difference in height equal to or less than 200 nm, whichever is appropriate.

(2.4) Other Constituent Elements of Illumination System

The illumination system 200 may further has a power supply unit. The power supply unit supplies electric power to the laser light source 21 and other components. The power supply unit may include a drive circuit for driving the laser light source 21 of the light source 2 and a control circuit for controlling the drive circuit. In the illumination system 200, controlling of the drive circuit by the control circuit allows the light-output of the laser light source 21 to be adjusted, as a result of which the luminance (brightness) of the illumination light L2 can be adjusted. The power supply unit may be contained in the case 20 of the light source 2. However, this is only an example and should not be construed as limiting. The power supply unit may not be contained in the case 20. To the power supply unit, a power supply voltage may be supplied from the off-site source via wires.

(3) Operation of Illumination System

According to the illumination system 200, the light source 2 (more specifically, the laser light source 21) emits light. In the illumination system 200, the light (blue light) emitted from the light source 2 is incident on the optical fiber 31 and transmitted through the optical fiber 31, and is incident on the light input/output portion 12 of the construction component 10. The incident light L1, which is light incident on the light input/output portion 12, is converted into the illumination light L2, and the illumination light L2 is emitted. The illumination light L2 may be a mixed light in which blue light and yellow light are mixed together. The mixed light, which is emitted from the light input/output portion 12, is incoherent light.

(4) Summary

The construction component 10 according to the first embodiment forms at least a part of the structure 1 that faces the target space S1. The construction component 10 has the first function, the second function, and the third function. The first function is a function of emitting the illumination light L2 toward the target space S1. The second function is a function of allowing the incident light L1 to enter the construction component. The incident light L1 is emitted from the light source 2 disposed out of the projection area A10, viewed from the target space S1, of the construction component 10, and is incident on the construction component 10 via the light transmission member 3. The third function is a function of converting the incident light L1 into the illumination light L2.

The construction component 10, the light radiating system 100, and the illumination system 200 according to the first embodiment enable reducing the weight of the construction component 10 that emits the illumination light L2.

Furthermore, the construction component 10 according to the first embodiment converts, instead of light from a light-emitting diode (LED), the incident light from the laser light source 21 into the illumination light L2 and emits the illumination light L2, in the light input/output portion 12. This enables narrowing the light distribution angle of the illumination light L2.

Furthermore, the construction component 10 according to the first embodiment enables reducing the light input/output portion 12 in size and making the design of the construction component 10 even more impressive for the viewer. In addition, since the construction component 10 according to the first embodiment does not need the power supply, a degree of freedom is increased in construction.

Furthermore, the illumination system 200 according to the first embodiment allows the light source 2, which needs to be supplied the electric power, to be located apart from the construction component 10, thus improving maintainability of the light source 2. Note that the illumination system 200 according to the first embodiment includes the plurality of construction components 10 and the plurality of light sources 2, which corresponds to the construction components 10, respectively.

Furthermore, the construction component 10 according to the first embodiment allows the light source 2, which is included in the illumination system 200, to be disposed out of the projection area A10 of the construction component 10, thus reducing a rise in temperature of the construction component 10.

Furthermore, the illumination system 200 according to the first embodiment employs the laser light (coherent light) emitted from the laser light source 21. The coherent light has a high directivity, so it is suitable to be transmitted over a long distance in space and to be coupled to the optical fiber 31. Accordingly, when the light source 2 is located out of the projection area A10 of the construction component 10, the illumination system 200 enables transmitting light efficiently into the projection area A10 of construction component 10 to form the incident light L1. In contrast, the illumination light L2 is incoherent light, so it is suitable for illuminating the target space S1 uniformly. In the construction component 10, the light radiating system 100, and the illumination system 200 according to the first embodiment, the construction component 10 has the third function, a coherence-lowering function, of converting the coherent light (the incident light L1) which is suitable for transmission, into the incoherent light (the illumination light L2) which is suitable for illumination. This enables reducing the weight of the construction component 10 that emits the high-grade illumination light L2.

Variations of First Embodiment

Figure 4:
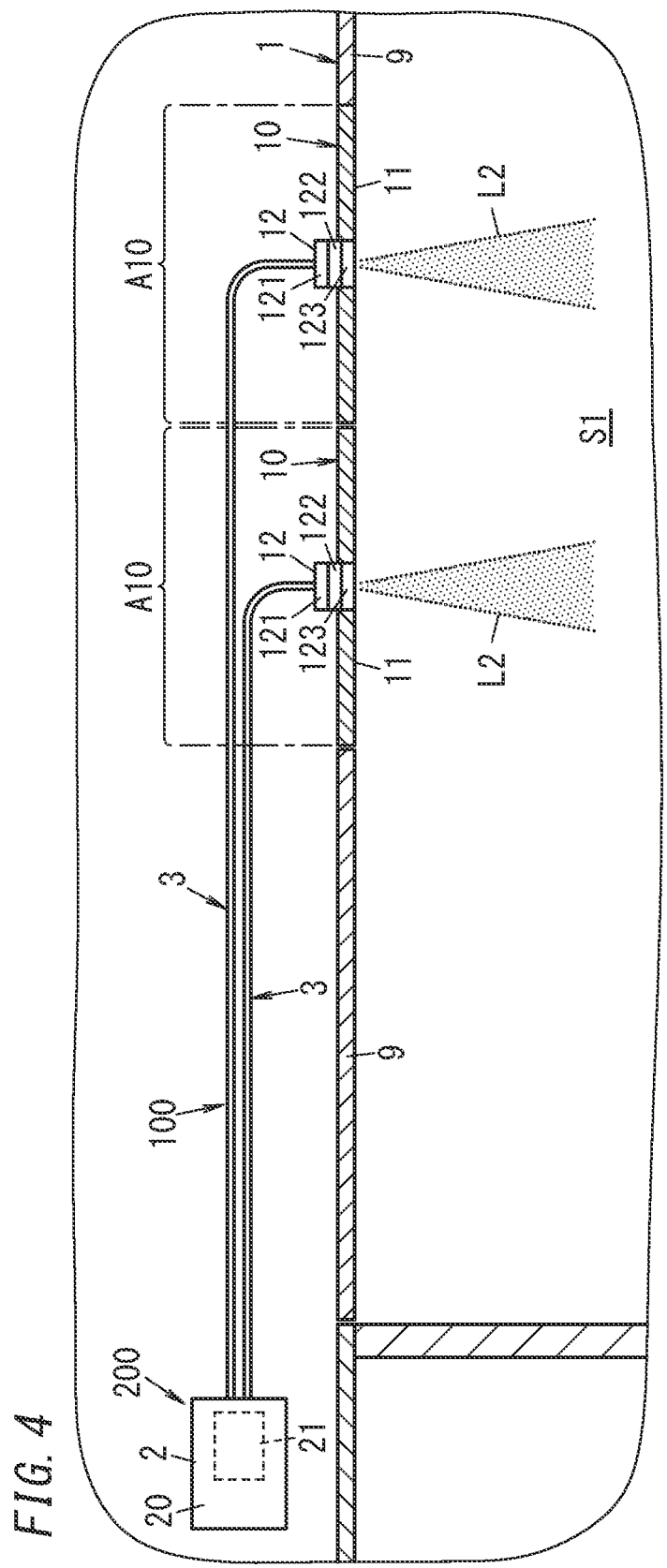
FIG. 4 illustrates a configuration of another illumination system including the construction component according to the first embodiment.

Below, a variation of the illumination system 200 of the first embodiment will be described with reference to FIG. 4. In the following description, any constituent element of the illumination system 200 of the variation, having the same function as a counterpart of the first embodiment, will be designated by the same reference numerals as that counterpart's, and description thereof will be omitted herein.

The illumination system 200 according to the variation is different from the illumination system 200 according to the first embodiment in that light is incident on a plurality of construction components 10 from one light source 2.

In the illumination system 200 according to the variation, the light source 2 includes a splitter that splits the light emitted from the laser light source 21 and makes the lights incident on a plurality of optical fibers 31. In the illumination system 200 according to variation 1, this facilitates constructing the structure 1 and the illumination system 200, which include a plurality of construction components 10.

In the illumination system 200, the light source 2 may include a plurality of laser light sources 21, and the laser light sources 21 and the optical fibers 31 may be connected with each other on a one-to-one basis.

The illumination system 200 according to the variation makes it possible to reduce the number of the light sources 2, thus improving maintainability, compared to a case where the light sources 2 correspond to the construction components 10 on a one-to-one basis.

Second Embodiment

Figure 5:
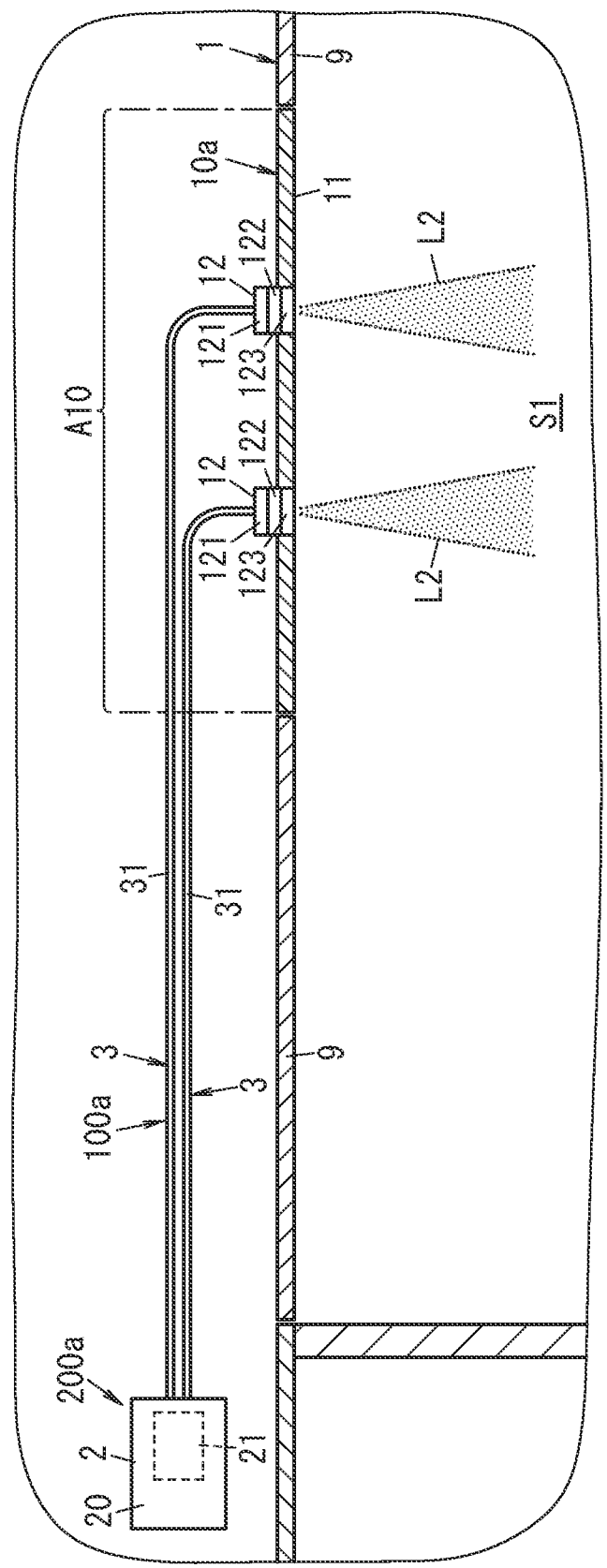
FIG. 5 illustrates a configuration of an illumination system including a construction component according to a second embodiment.

Below, a construction component 10a, a light radiating system 100a and an illumination system 200a according to a second embodiment will be described with reference to FIG. 5. In the following description, any constituent element of the construction component 10a, the light radiating system 100a, and the illumination system 200a of the second embodiment, having the same function as a counterpart of the construction component 10, the light radiating system 100, and the illumination system 200 of the first embodiment described above, will be designated by the same reference numeral as that counterpart's, and description thereof will be omitted herein.

The construction component 10a according to the second embodiment is different from the construction component 10 according to the first embodiment in that the construction component 10a includes a plurality of (e.g., two in the example) light input/output portions 12. The light radiating system 100a according to the second embodiment is different from the light radiating system 100 according to the first embodiment in that it includes the construction component 10a, instead of the light radiating system 100 of the construction component 10 according to the first embodiment. Furthermore, the illumination system 200a according to the second embodiment is different from the illumination system 200 according to the first embodiment in that it includes the light radiating system 100a, instead of the light radiating system 100 according to the first embodiment.

In the construction component 10a, the light input/output portions 12 are apart from each other. The light radiating system 100a includes a plurality of optical fibers 31 corresponding to the plurality of the light input/output portions 12 on a one-to-one basis. In the illumination system 200a, the light source 2 includes a distributor that makes the light emitted from one laser light source 21 incident on the plurality of optical fibers 31.

The construction component 10a according to the second embodiment forms, like the construction component 10 according to the first embodiment, at least a part of the structure 1 facing the target space S1. The construction component 10a has a first function, a second function, and a third function. The first function is a function of emitting the illumination light L2 toward target space S1. The second function is a function of allowing the incident light L1 to enter the construction component 10a. The incident light L1 is emitted from the light source 2 disposed out of the projection area A10, viewed from the target space S1, of the construction component 10a, and is incident on the construction component 10a via the light transmission member 3. The third function is a function of converting the incident light L1 into the illumination light L2.

The construction component 10a, the light radiating system 100a, and the illumination system 200a according to second embodiment enable reducing the weight of the construction component 10a that emits the illumination light L2 from two points.

The construction component 10a according to the second embodiment is configured to make lights from one light source 2 incident on the plurality of light input/output portions 12. This enables improving ease of implication while the construction component 10a having the plurality of light input/output portions 12.

Third Embodiment

Below, a construction component 10b, a light radiating system 100b, and an illumination system 200b according to a third embodiment will be described with reference to FIG. 6. In the following description, any constituent element of the construction component 10b, the light radiating system 100b, and the illumination system 200b of the third embodiment, having the same function as a counterpart of the construction component 10a, the light radiating system 100a, and the illumination system 200a of the second embodiment described above, will be designated by the same reference numeral as that counterpart's, and description thereof will be omitted herein.

The construction component 10b according to the third embodiment is different from the construction component 10a according to the second embodiment in that the plurality of light input/output portions 12 have light distribution characteristics different from each other. The light radiating system 100b according to the third embodiment is different from the light radiating system 100a according to the second embodiment in that it includes the construction component 10b, instead of the construction component 10a of the light radiating system 100a according to the second embodiment. Furthermore, the illumination system 200b according to the third embodiment is different from the illumination system 200a according to the second embodiment in that it includes the light radiating system 100b, instead of the light radiating system 100a according to the second embodiment.

Figure 6:
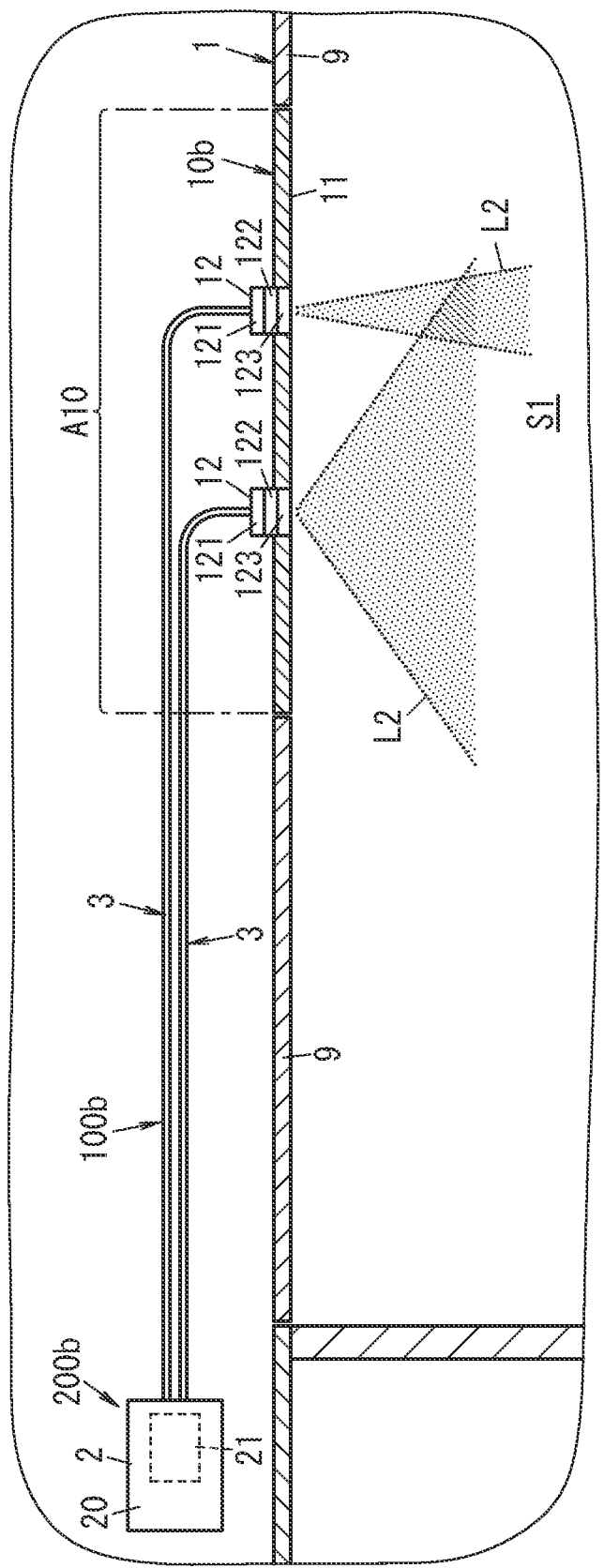
FIG. 6 illustrates a configuration of an illumination system including a construction component according to a third embodiment.

In the construction component 10b according to the third embodiment, the light distribution angle of the illumination light L2 emitted from the light input/output portion 12 on the left side in FIG. 6 is larger than the light distribution angle of the illumination light L2 emitted from the light input/output portion 12 on the right side in FIG. 6. Here, the light input/output portion 12 on the left side in FIG. 6 and the light input/output portion 12 on the right side in FIG. 6 include the light-outputting portions 123 having lens shapes different from each other, and thereby their light distribution angles of them are different from each other.

In the construction component 10b according to the third embodiment, the illumination light L2 emitted from the light input/output portion 12 on the left side in FIG. 6 may be utilized as an ambient illumination, and the illumination light L2 emitted from the light input/output portion 12 on the right side in FIG. 6 may be utilized as a task illumination. Accordingly, the construction component 10b, the light radiating system 100b, and the illumination system 200b according to the third embodiment enable implementing a task ambient illumination.

The construction component 10b according to the third embodiment forms, like the construction component 10a according to the second embodiment, at least a part of the structure 1 facing the target space S1. The construction component 10b has a first function, a second function, and a third function. The first function is a function of emitting the illumination light L2 toward the target space S1. The second function is a function of allowing the incident light L1 to enter the construction component 10b. The incident light L1 is emitted from the light source 2 disposed out of the projection area A10, viewed from the target space S1, of the construction component 10b and is incident on the construction component 10b via the light transmission member 3. The third function is a function of converting the incident light L1 into the illumination light L2.

The construction component 10b, the light radiating system 100b, and the illumination system 200b according to the third embodiment enable reducing the weight of the construction component 10b that emits the illumination light L2 from two points.

Fourth Embodiment

Figure 7:
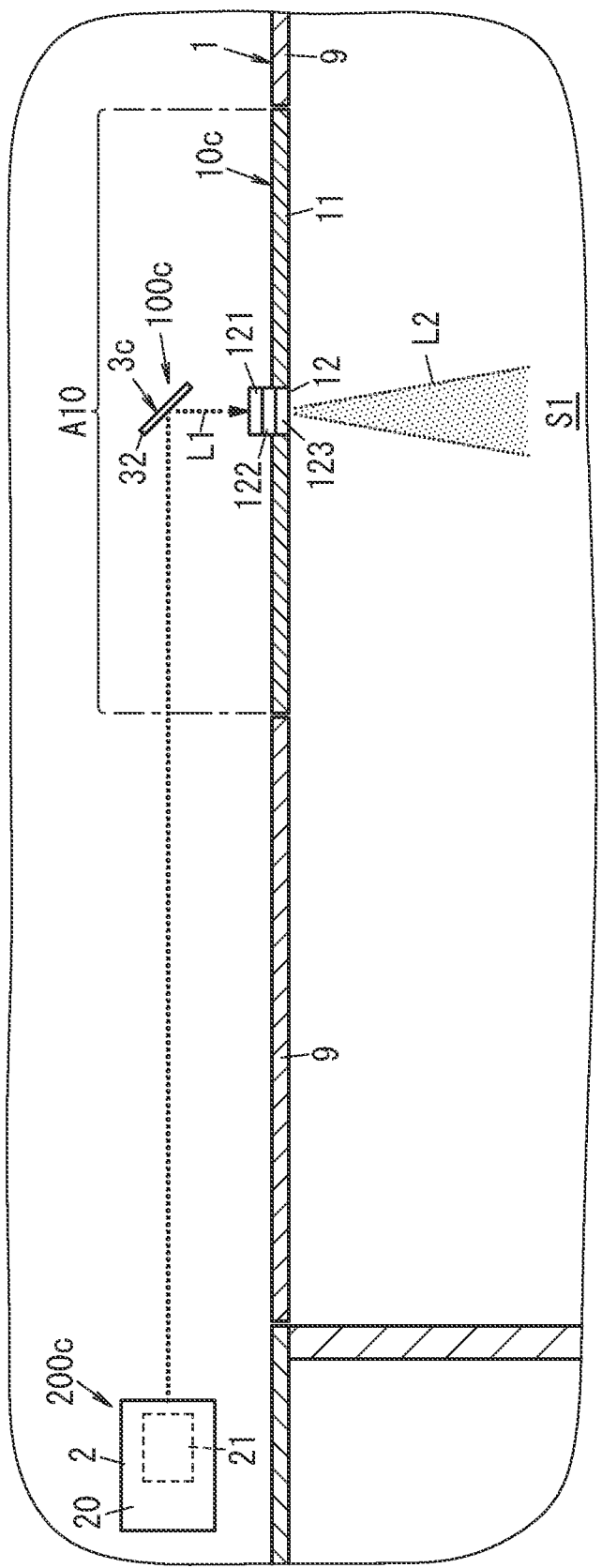
FIG. 7 illustrates a configuration of an illumination system including a construction component according to a fourth embodiment.

Below, a construction component 10c, a light radiating system 100c, and an illumination system 200c according to a fourth embodiment will be described with reference to FIG. 7. In the following description, any constituent element of the construction component 10c, the light radiating system 100c, and the illumination system 200c of the fourth embodiment, having the same function as a counterpart of the construction component 10, the light radiating system 100, and the illumination system 200 of the first embodiment described above, will be designated by the same reference numeral as that counterpart's, and description thereof will be omitted herein.

The construction component 10c according to the fourth embodiment is different from the construction component 10 according to the first embodiment in that light coming from the light source 2 is incident on the construction component 10c (e.g., its light input/output portion 12) via a light transmission member 3c. The light radiating system 100c according to the fourth embodiment is different from the light radiating system 100 according to the first embodiment in that it includes the construction component 10c and the light transmission member 3c, instead of the construction component 10 and the light transmission member 3 of the light radiating system 100 according to the first embodiment. Furthermore, the illumination system 200c according to the fourth embodiment is different from the illumination system 200 according to the first embodiment in that it includes the light radiating system 100c, instead of the light radiating system 100 according to the first embodiment.

The light transmission member 3c includes a mirror 32. The mirror 32 is disposed, in a thickness direction of the construction component 10c, opposite to the target space S1 with reference to the construction component 10c. In other words, the mirror 32 is disposed close to the light-input portion 121, away from the light-outputting portion 123, of the light input/output portion 12, and is disposed apart from the light input/output portion 12 in the thickness direction of the construction component 10c. The mirror 32 is disposed within the projection area A10 along the thickness direction of the construction component 10c, and is overlapped with the light input/output portion 12 in the thickness direction of the construction component 10c. The mirror 32 is disposed apart from the light source 2 in a direction perpendicular to the thickness direction of the construction component 10c.

The mirror 32 is disposed so as to reflect the light, which is emitted from the light source 2 (e.g., its laser light source 21) and is transmitted through a space, toward the construction component 10c (e.g., its light input/output portion 12). Here, the construction component 10c has the second function of allowing the incident light L1 to enter the construction component 10c. The incident light L1 is emitted from the light source 2 disposed out of the projection area A10, viewed from the target space S1, of the construction component 10c, and is incident on the construction component 10c via the light transmission member 3c. The light transmission member 3c does not include a member corresponding to the optical fiber 31 included in the light transmission member 3 of the light radiating system 100 and the illumination system 200 according to the first embodiment. Therefore, the light-input portion 121, which has the second function, does not have an optical fiber connector.

The construction component 10c according to the fourth embodiment forms, like the construction component 10 according to the first embodiment, at least a part of the structure 1 facing the target space S1. The construction component 10c has a first function, a second function, and a third function. The first function is a function of emitting the illumination light L2 toward the target space S1. The second function is a function of allowing the incident light L1 to enter the construction component 10c. The incident light L1 is emitted from the light source 2 disposed out of projection area A10, viewed from the target space S1, of the construction component 10c, and is incident on the construction component 10c via the light transmission member 3c. The third function is a function of converting the incident light L1 into the illumination light L2.

The construction component 10c, the light radiating system 100c, and the illumination system 200c according to the fourth embodiment enable reducing the weight of the construction component 10c that emits the illumination light L2.

Fifth Embodiment

Figure 8:
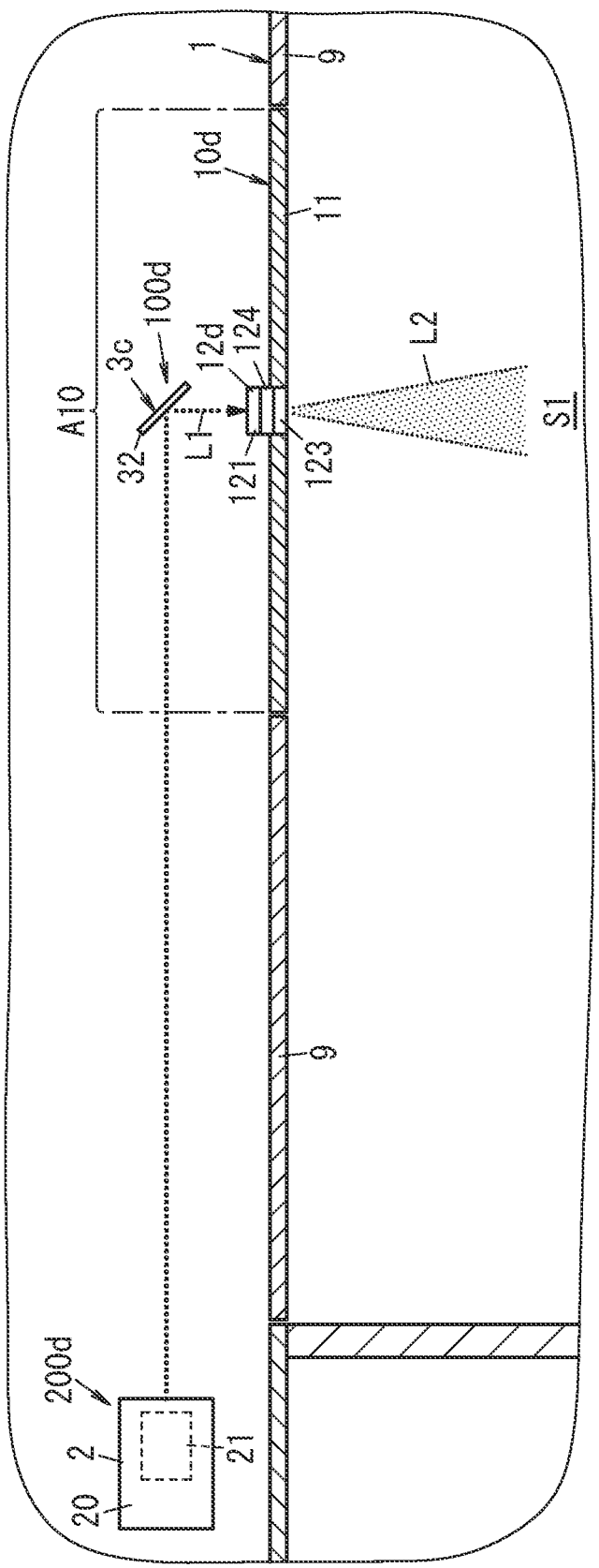
FIG. 8 illustrates a configuration of an illumination system including a construction component according to a fifth embodiment.

Below, a construction component 10d, a light radiating system 100d, and an illumination system 200d according to a fifth embodiment will be described with reference to FIG. 8. In the following description, any constituent element of the construction component 10d, the light radiating system 100d, and the illumination system 200d of the fifth embodiment, having the same function as a counterpart of the construction component 10c, the light radiating system 100c, and the illumination system 200c of the fourth embodiment described above, will be designated by the same reference numeral as that counterpart's, and description thereof will be omitted herein.

In the construction component 10d according to the fifth embodiment, the incident light L1 incident on the construction component 10d is white light. The incident light L1 is emitted from the light source 2 disposed out of the projection area A10, viewed from the target space S1, of the construction component 10d, and is incident on the construction component 10d via the light transmission member 3c.

The laser light source 21 of the light source 2 includes a first semiconductor laser that emits a red light ray, a second semiconductor laser that emits a green light ray, and a third semiconductor laser that emits a blue light ray to emit a white light ray containing a red light ray, a green light ray, and a blue light ray.

In the construction component 10d, the light input/output portion 12d does not include a member corresponding to the wavelength-converting portion 122 of the light input/output portion 12 of the construction component 10c according to the fourth embodiment. The construction component 10d includes, in the light input/output portion 12d, a first function, a second function, and a third function. The first function is a function of emitting the illumination light L2 toward the target space S1. The second function is a function of allowing the incident light L1 to enter the construction component 10d. The incident light L1 is emitted from the light source 2, which is disposed out of the projection area A10, viewed from the target space S1, of the construction component 10d and is incident on the construction component 10d via the light transmission member 3c. The third function is a function of converting the incident light L1 into the illumination light L2. The light input/output portion 12d includes an optical diffusion element 124 disposed between the light-input portion 121 and the light-outputting portion 123, instead of the wavelength-converting portion 122 of the construction component 10c according to the fourth embodiment. The optical diffusion element 124 is, for example, an optical diffusion plate made of glass. In the construction component 10d according to the fifth embodiment, the optical diffusion element 124 has the third function. In the construction component 10d, the third function includes a function of converting the incident light L1 into the illumination light L2 that has a light distribution characteristic different from that of the incident light L1. While the incident light L1 is light with a high-coherence, the illumination light L2 is light with a relatively low-coherence.

The construction component 10d, the light radiating system 100d, and the illumination system 200d according to the fifth embodiment enable reducing the weight of the construction component 10d that emits the illumination light L2.

Since the construction component 10d according to the fifth embodiment does not include a member corresponding to the wavelength-converting portion 122 of the construction component 10c, a temperature rise of the construction component 10d is further reduced, so that its service life is extended compared to the construction component 10c.

Sixth Embodiment

Below, a construction component 10e, a light radiating system 100e, and an illumination system 200e according to the sixth embodiment will be described with reference to FIG. 9. In the following description, any constituent element of the construction component 10e, the light radiating system 100e, and the illumination system 200e of the sixth embodiment, having the same function as a counterpart of the construction component 10c, the light radiating system 100c, and the illumination system 200c of the fourth embodiment described above, will be designated by the same reference numeral as that counterpart's, and description thereof will be omitted herein.

The construction component 10e according to the sixth embodiment is different from the construction component 10c according to the fourth embodiment in that it includes a plurality of (e.g., two in the example) light input/output portions 12. The light radiating system 100e according to the sixth embodiment is different from the light radiating system 100c according to the fourth embodiment in that it includes the construction component 10e, instead of the construction component 10c of the light radiating system 100c according to the fourth embodiment. Furthermore, the illumination system 200e according to the sixth embodiment is different from the illumination system 200c according to the fourth embodiment in that it includes the light radiating system 100e, instead of the light radiating system 100c according to the fourth embodiment.

In the construction component 10e, the light input/output portions 12 are apart from each other. The light radiating system 100e includes a light transmission member 3e, instead of the light transmission member 3c of the light radiating system 100c according to the fourth embodiment. The light transmission member 3e includes a mirror 33, instead of the mirror 32 included in the light transmission member 3c. The mirror 33 serves as a mirror that can sweep the light coming from the light source 2 over the construction component 10e. The mirror 33 allows the light from the light source 2, as the incident light L1, to be incident selectively on any of the plurality of light input/output portions 12 of the construction component 10e. The mirror 33 is a micro-electromechanical systems (MEMS) mirror. However, this is only an example and should not be construed as limiting. The mirror 33 may be a polygon mirror, for example.

Figure 9:
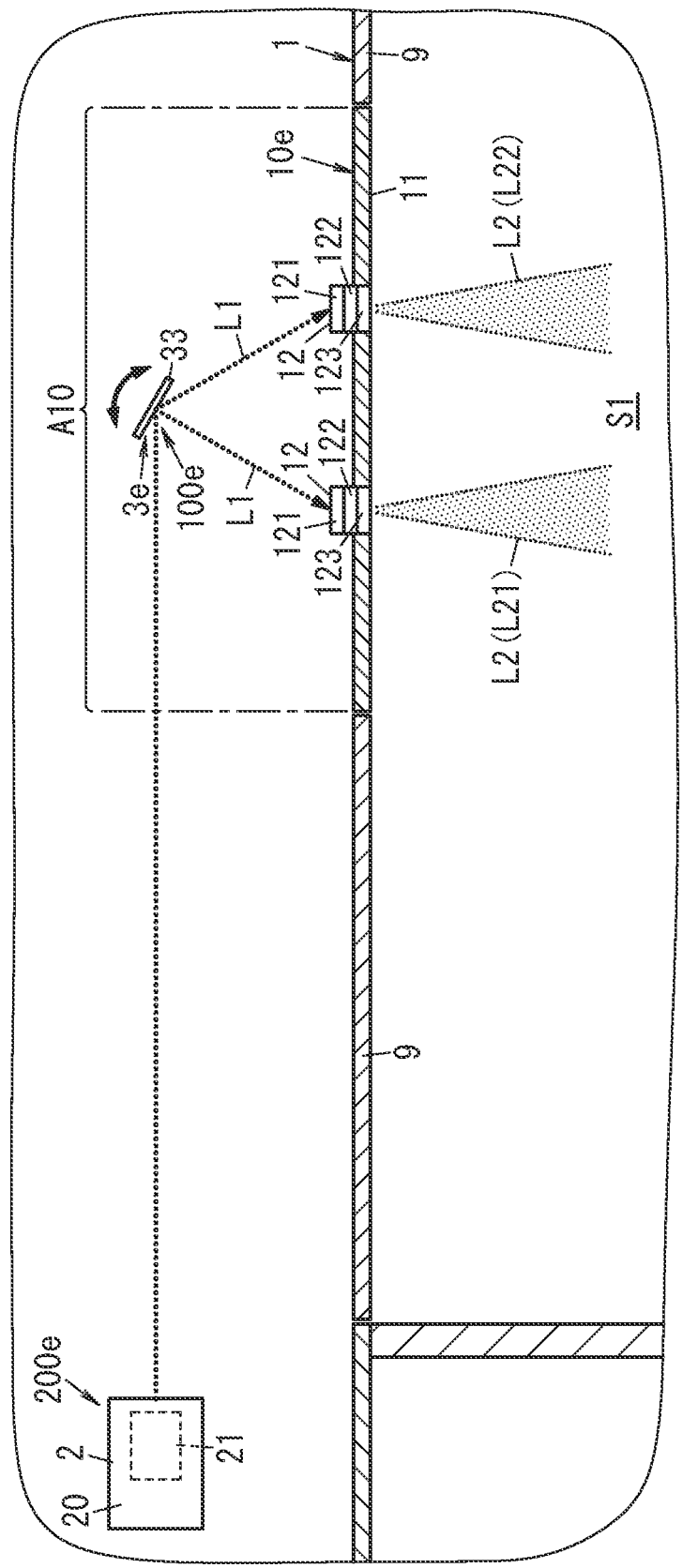
FIG. 9 illustrates a configuration of an illumination system including a construction component according to a sixth embodiment.

In the construction component 10e according to the sixth embodiment, the properties of the illumination light L2 (referred to as a first illumination light L21) to be emitted from a light input/output portion 12 on the left side in FIG. 9 is different from the properties of the illumination light L2 (referred to as a second illumination light L22) to be emitted from the light input/output portion 12 on the right side in FIG. 9. Here, the property of the illumination light L2 means color temperature. However, this is only an example and should not be construed as limiting. The properties of the illumination light L2 may include, for example, color rendering performance or light distribution angle.

The construction component 10e according to the sixth embodiment forms, as the construction component 10c according to the fourth embodiment 4 does, at least a part of the structure 1 that faces the target space S1. The construction component 10e has a first function, a second function, and a third function. The first function is a function of emitting the illumination light L2 toward the target space S1. The second function is a function of allowing the incident light L1 to enter the construction component 10e. The incident light L1 is emitted from the light source 2 disposed out of the projection area A10, viewed from the target space S1, of the construction component 10e, and is incident on the construction component 10e via the light transmission member 3e. The third function is a function of converting the incident light L1 into the illumination light L2.

The construction component 10e, the light radiating system 100e, and the illumination system 200e according to the sixth embodiment enable reducing the weight of the construction component 10e that selectively emits the illumination light L2 from two points.

(Other Variations)

Note that the first to sixth embodiments described above are only ones of various embodiments of the present disclosure and should not be construed as limiting. Rather, the first to sixth embodiments may be readily modified in various manners depending on a design choice or any other factor without departing from the scope of the present disclosure.

For example, viewed along the thickness direction of the construction component 10, the outer peripheral shape of the light input/output portion 12 does not have to be circular. It may have, for example, an ellipse, rectangle, polygonal, or star shape. The polygonal shape includes pentagon, and more.

Furthermore, the construction component 10 does not have to be a ceiling member. It may be, for example, a wall member, flooring, or a beam. The construction component 10 has a panel shape when employed in a ceiling member, a wall member, or flooring.

Furthermore, the laser light source 21 included in the light source 2 does not have to be a semiconductor laser that emits a ray of blue laser light. It may be, for example, a semiconductor laser that emits a ray of purple laser light. In this case, the wavelength-converting portion 122 may suitably include blue fluorescent particles, yellow fluorescent particles, green fluorescent particles, and red fluorescent particles.

Furthermore, the light source 2 may include, for example, a light emitting diode (LED) light source and an optical system, instead of the laser light source 21. The optical system collimates the light coming from the LED light source and emits the collimated light.

(Recapitulation)

The first to sixth embodiments and their variations described above may be specific implementations of the following aspects of the present disclosure.

A construction component (10; 10a; 10b; 10c; 10d; 10e) according to a first aspect forms at least a part of a structure (1) that faces a target space (S1). The construction component (10; 10a; 10b; 10c; 10d; 10e) includes a first function, a second function, and a third function. The first function is a function of emitting illumination light (L2) toward the target space (S1). The second function is a function of allowing incident light to enter the construction component (10; 10a; 10b; 10c; 10d; 10e). The incident light is emitted from a light source (2) disposed out of a projection area (A10), viewed from the target space (S1), of the construction component (10; 10a; 10b; 10c; 10d; 10e), and is incident on the construction component (10; 10a; 10b; 10c; 10d; 10e) via a light transmission member (3; 3c; 3e). The third function is a function of converting the incident light into the illumination light (L2).

The construction component (10; 10a; 10b; 10c; 10d; 10e) according to the first aspect enables reducing the weight of the construction component (10; 10a; 10b; 10c; 10d; 10e) that can emit illumination light (L2).

In a construction component (10; 10a; 10b; 10c; 10d; 10e) according to a second aspect, which may be implemented in conjunction with the first aspect, the light source (2) includes a laser light source (21).

The construction component (10; 10a; 10b; 10c; 10d; 10e) according to the second aspect enables reducing the weight of the construction component (10; 10a; 10b; 10c; 10d; 10e).

In a construction component (10; 10a; 10b) according to a third aspect, which may be implemented in conjunction with the first or second aspect, the light transmission member (3) includes an optical fiber (31).

The construction component (10; 10a; 10b) according to the third aspect enables increasing the flexibility of the arrangement of the construction component (10; 10a; 10b).

In a construction component (10c; 10d; 10e) according to a fourth aspect, which may be implemented in conjunction with the first or second aspect, the light transmission member (3c; 3e) includes a mirror (32; 33).

The construction component (10c; 10d; 10e) according to the fourth aspect enables making the light coming from the light source (2) incident on the construction component (10c; 10d; 10e) without using an optical fiber.

In a construction component (10; 10a; 10b; 10c; 10e; 10d) according to a fifth aspect, which may be implemented in conjunction with any one of the first to fourth aspects, the third function includes a function of converting the incident light (L1) into the illumination light (L2) that has a light distribution characteristic different from a light distribution characteristic of the incident light (L1).

In a construction component (10; 10a; 10b; 10c; 10e) according to a sixth aspect, which may be implemented in conjunction with any one of the first to fifth aspects, the third function includes a function of converting the incident light (L1) into the illumination light (L2) that has a wavelength different from a wavelength of the incident light (L1).

In the construction component (10; 10a; 10b; 10c; 10e) according to the sixth aspect, the illumination light (L2) may be a light having a spectrum different from that of the incident light (L1).

In a construction component (10; 10a; 10b; 10c; 10d; 10e) according to a seventh aspect, which may be implemented in conjunction with any one of the first to sixth aspects, the construction component (10; 10a; 10b; 10c; 10d; 10e) has a panel shape.

The construction component (10; 10a; 10b; 10c; 10d; 10e) according to the seventh aspect enables reducing the construction component (10; 10a; 10b; 10c; 10d; 10e) in thickness and weight.

In a construction component (10; 10a; 10b; 10c; 10d; 10e) according to an eighth aspect, which may be implemented in conjunction with any one of the first to seventh aspects, the construction component (10; 10a; 10b; 10c; 10d; 10e) is a ceiling member.

The construction component (10) according to the eighth aspect enables reducing the weight of the construction component (10; 10a; 10b; 10c; 10d; 10e), thus improving ease of implementation.

A light radiating system (100; 100a; 100b; 100c; 100d; 100e) according to a ninth aspect includes the construction component (10; 10a; 10b; 10c; 10d; 10e) according to any one of the first to eighth aspects, and a light transmission member (3; 3c; 3e).

The light radiating system (100; 100a; 100b; 100c; 100d; 100e) according to the ninth aspect enables reducing the weight of the construction component (10; 10a; 10b; 10c; 10d; 10e) that can emit the illumination light (L2).

An illumination system (200; 200a; 200b; 200c; 200d; 200e) according to a tenth aspect includes the light radiating system (100; 100a; 100b; 100c; 100d; 100e) according to the ninth aspect, and a light source (2).

The illumination system (200; 200a; 200b; 200c; 200d; 200e) according to the tenth aspect enables reducing the weight of the construction component (10; 10a; 10b; 10c; 10d; 10e) that can emit the illumination light (L2)

In an illumination system (200; 200a; 200b; 200c; 200d; 200e) according to an eleventh aspect, which may be implemented in conjunction with the tenth aspect, the construction component (10) includes a plurality of construction components (10). The illumination system (200; 200a; 200b; 200c; 200d; 200e) is configured to allow light emitted from the light source (2), which is single, incident on the plurality of construction components (10; 10a; 10b; 10c; 10d; 10e).

The illumination system (200; 200a; 200b; 200c; 200d; 200e) according to the eleventh aspect, the number of light source (2) is smaller than that of the construction component (10; 10a; 10b; 10c; 10d; 10e), thus realizing better maintainability.

In an illumination system (200; 200a; 200b; 200c; 200d; 200e) according to a twelfth aspect, which may be implemented in conjunction with the eleventh aspect, the illumination light (L2) includes a plurality of illumination lights that are emitted respectively from the plurality of construction components (10; 10a; 10b; 10c; 10d; 10e) and have light distribution characteristics different from each other.

The illumination system (200; 200a; 200b; 200c; 200d; 200e) according to the twelfth aspect enables realizing a task ambient illumination, for example.

REFERENCE SIGNS LIST

1 Structure
2 Light Source
20 Case
21 Laser Light Source
3, 3c, 3e Light Transmission Member
31 Optical Fiber
311 First End
312 Second End
32 Mirror
33 Mirror
10, 10a, 10b, 10c, 10d, 10e Construction Component
100, 100a, 100b, 100c, 100d, 100e Light radiating System
200, 200a, 200b, 200c, 200d, 200e Illumination System
A10 Projection Area
L1 Incident Light
L2 Illumination Light
S1 Target Space

The invention claimed is:

1. A construction component for forming at least a part of a structure that faces a target space, the construction component having a panel shape and including:
    a main body having a panel shape, the main body having an outer peripheral shape same as an outer peripheral shape of the construction component viewed in a thickness direction of the construction component; and
    a light input/output portion located within a circumferential periphery of the main body and being apart from the circumferential periphery of the main body viewed in the thickness direction of the construction component,
    wherein:
    the light input/output portion penetrates the main body,
    the light input/output portion is integrally formed with the main body,
    the light input/output portion comprises a first function, a second function, and a third function,
    the construction component is configured to be supported by a grid-like support member in a complex ceiling system to be arranged adjacent to a ceiling member of the complex ceiling system,
    the first function is a function of emitting illumination light toward the target space;
    the second function is a function of allowing incident light to enter the construction component, the incident light being emitted from a light source disposed out of a projection area, viewed from the target space, of the construction component and being incident on the construction component via a light transmission member, and
    the third function is a function of converting the incident light into the illumination light.

2. The construction component of claim 1, wherein the light source includes a laser light source.

3. The construction component of claim 1, the light transmission member includes an optical fiber.

4. The construction component of claim 1, wherein the light transmission member includes a mirror.

5. The construction component of claim 1, wherein the third function includes a function of converting the incident light into the illumination light that has a light distribution characteristic different from a light distribution characteristic of the incident light.

6. The construction component of claim 1, wherein the third function includes a function of converting the incident light into the illumination light that has a wavelength different from a wavelength of the incident light.

7. A light radiating system comprising:
    the construction component of claim 1; and
    the light transmission member.

8. An illumination system comprising:
    the light radiating system of claim 7; and
    the light source.

9. The illumination system of claim 8, wherein the construction component includes a plurality of construction components, and the illumination system is configured to allow light emitted from the light source, which is single, incident on the plurality of construction components.

10. The illumination system of claim 9, wherein the illumination light includes a plurality of illumination lights that are emitted respectively from the plurality of construction components and have light distribution characteristics different from each other.

11. The construction component of claim 2, the light transmission member includes an optical fiber.

12. The construction component of claim 2, wherein the light transmission member includes a mirror.

13. The construction component of claim 2, wherein the third function includes a function of converting the incident light into the illumination light that has a light distribution characteristic different from a light distribution characteristic of the incident light.

14. The construction component of claim 3, wherein the third function includes a function of converting the incident light into the illumination light that has a light distribution characteristic different from a light distribution characteristic of the incident light.

15. The construction component of claim 4, wherein the third function includes a function of converting the incident light into the illumination light that has a light distribution characteristic different from a light distribution characteristic of the incident light.

16. A construction component for forming at least a part of a structure that faces a target space, the construction component including:

a first function of emitting illumination light toward the target space;

a second function of allowing incident light to enter the construction component, the incident light being emitted from a light source disposed out of a projection area, viewed from the target space, of the construction component and being incident on the construction component via a light transmission member; and a third function of converting the incident light into the illumination light, wherein the light transmission member includes a mirror.

17. A illumination system comprising:

a plurality of construction components;

a light transmission member; and a light source, wherein:

each of the plurality of construction components includes:

a first function of emitting illumination light toward a target space;

a second function of allowing incident light to enter a corresponding one of the plurality of construction components, the incident light being emitted from the light source disposed out of a projection area, viewed from the target space, of the corresponding one of the plurality of construction components and being incident on the corresponding one of the plurality of construction components via the light transmission member; and a third function of converting the incident light into the illumination light, the illumination system is configured to allow light emitted from the light source, which is single, incident on the plurality of construction components, and the illumination light includes a plurality of illumination lights that are emitted respectively from the plurality of construction components and have light distribution characteristics different from each other.

* * * * *